July 13, 1965
J. CLIFFORD
3,194,908
THREE-POLE CIRCUIT BREAKER FOR USE IN A SINGLE-PHASE
PANELBOARD FOR PROTECTING A THREE-PHASE LOAD
Filed Jan. 31, 1962
2 Sheets-Sheet 1
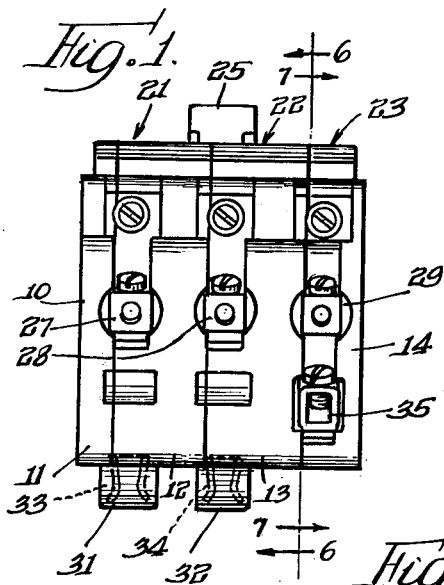
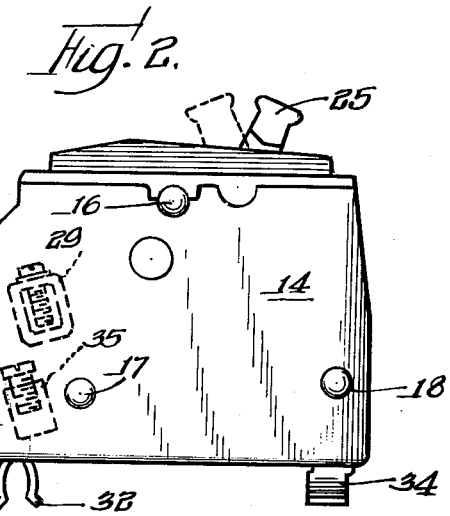
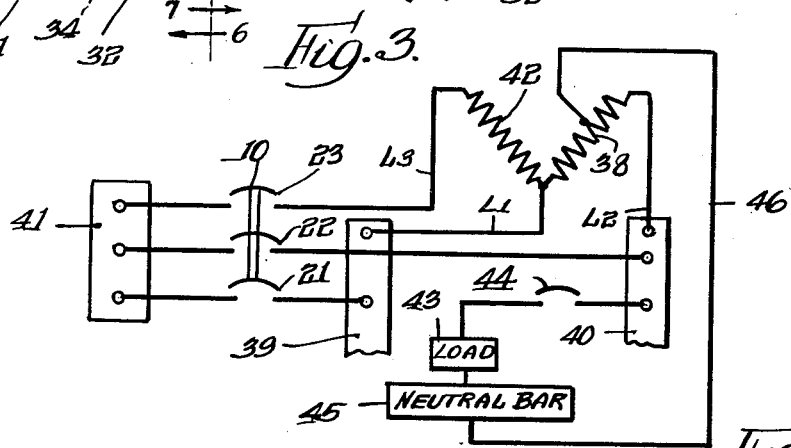
INVENTOR.
Joseph Clifford
BY
Paul J. Rose
Atty.

July 13, 1965  J. CLIFFORD  3,194,908
THREE-POLE CIRCUIT BREAKER FOR USE IN A SINGLE-PHASE
PANELBOARD FOR PROTECTING A THREE-PHASE LOAD
Filed Jan. 31, 1962  2 Sheets-Sheet 2

INVENTOR.
Joseph Clifford
By: Paul J. Rose
Atty.

United States Patent Office 3,194,908
Patented July 13, 1965

3,194,908
THREE-POLE CIRCUIT BREAKER FOR USE IN A SINGLE-PHASE PANELBOARD FOR PROTECTING A THREE-PHASE LOAD
Joseph Clifford, Cedar Rapids, Iowa, assignor to Square D Company, Park Ridge, Ill., a corporation of Michigan
Filed Jan. 31, 1962, Ser. No. 170,072
1 Claim. (Cl. 200—51)

This invention relates generally to a three-pole circuit breaker of the molded-case, plug-in type and more particularly to a three-pole circuit breaker in which two poles are adapted to be plugged into a single-phase panelboard or load center to electrically connect them respectively to the two main bus bars thereof which are respectively fed by two power supply lines, and the third pole is adapted to be electrically connected to a third power supply line which feeds only the third pole, whereby the single-phase panelboard and the third power supply line are able to accommodate a three-phase load, such as a three-phase motor of an air conditioner, and the single-phase panelboard having only two main bus bars need not be replaced by a three-phase panelboard having three main bus bars to accommodate the three-phase load.

An object of the invention is to provide an improved three-pole circuit breaker adapted to feed a three-phase load while mounted in a single-phase panelboard.

Another object is to provide an improved three-pole circuit breaker of the type having two poles adapted to be plugged into a single-phase panelboard having only two main bus bars fed respectively by two power lines, and a third pole adapted to receive a third power line to enable the circuit breaker to feed a three-phase load.

A further object is to provide an improved three-pole circuit breaker of the type wherein each pole has an electrical connector adjacent an end of the circuit breaker for receiving an electrical conductor connected to a three-phase load, and the third pole also has a second electrical connector adjacent the same end of the circuit breaker for receiving a power supply line, the center lines of the two connectors of the third pole being substantially in a common plane.

A still further object is to provide an improved three-pole circuit breaker wherein an electrical connector of one pole is adapted to receive a power supply line and is supported by one end of a substantially rigid conductor received in a groove on the inner side of a casing portion for that pole and having a stationary contact for that pole mounted on the other end.

Other objects will be apparent to those skilled in the art.

In the drawings, FIGURE 1 is an end view of a three-pole circuit breaker constructed in accordance with the invention and having a modified pole on the right;

FIGURE 2 is a side view of the circuit breaker of FIGURE 1;

FIGURE 3 is a wiring diagram of a single-phase panelboard having two main bus bars fed by two power supply lines and a modified three-pole circuit breaker constructed in accordance with the invention and having a third power supply line connected thereto;

FIGURE 4 is a perspective view of the power supply line connector and stationary contact assembly of the modified pole of a three-pole circuit breaker constructed in accordance with the invention;

FIGURE 5 is a fragmentary sectional view taken substantially along the line 5—5 of FIGURE 7.

FIGURE 6 is a view taken substantially along line 6—6 of FIGURE 1 but including the entire connector and stationary contact assembly of FIGURE 4;

FIGURE 7 is a view taken substantially along the line 7—7 of FIGURE 1.

FIGURE 1 shows a three-pole circuit breaker 10 having a molded casing formed of four sections 11, 12, 13, and 14 rivetted together by three rivets 16, 17, and 18 indicated in FIGURE 2. The section 11 is a cover for a pole 21 at the left in FIGURE 1; the section 12 is a base for the pole 21 formed integrally with a cover for a center pole 22; the section 13 is a base for the pole 22 formed integrally with a cover for a pole 23 at the right in FIGURE 1; and the section 14 is a base for the pole 23. It will be understood that a pair of opposed side walls of the casing are provided by the sections 11 and 14 and that a pair of opposed end walls of the casing are provided by flange portions on the four sections 11, 12, 13, and 14. It will also be understood that each of the sections 12 and 13 may be made of two separate parts similar to the sections 11 and 14, respectively, as in U.S. Patent 2,889,428, which is assigned to the assignee of the present application.

The pole 22 is provided with an operating handle 25 which also operates the mechanism of the poles 21 and 23 in a manner hereinafter described.

The poles 21, 22, and 23 are provided with electrical connectors or terminals 27, 28, and 29, respectively, each adapted to receive a wire connected to one phase of a three-phase load such as a three-phase motor of an air conditioning apparatus. The poles 21 and 22 are also provided with means for plugging into a single-phase panelboard, the plug-in means including a pair of spring clips 31 and 32 associated with the poles 21 and 22, respectively, adapted to be mechanically connected to a panelboard support (not shown) and a pair of spring clips or terminal jaws 33 and 34 for the poles 21 and 22, respectively, adapted to be mechanically and electrically connected respectively to a pair of branch conductors or auxiliary bus bars (not shown) fed respectively from a pair of spaced parallel main bus bars forming a part of a single-phase electrical panelboard or load center.

The pole 23, rather than having terminal jaws such as the jaws 33 and 34 for electrical connection to one of a pair of main bus bars of a single-phase panelboard, is provided with an electrical connector or terminal 35 having a body portion 36 with an aperture therein adapted to receive a third power supply line leading, for example, from the secondary winding of a transformer connected in open-delta fashion with the secondary winding of another transformer feeding the two main bus bars of the single-phase panelboard. Such an arrangement can be understood by reference to the diaphragm of FIGURE 3 wherein a secondary winding 38 of a transformer feeds one bus bar 39 (shown fragmentarily) of a single-phase panelboard through a power supply line L1 and the other bus bar 40 of the single-phase panelboard through a power supply line L2. The terminal jaws 33 of the pole 21 of the three-pole circuit breaker 10 are electrically connected to the bus bar 39 and the terminal jaws 34 of the pole 22 are electrically connected to the bus bar 40. In order to accommodate a three-phase load 41 connected to the terminals 27, 28, and 29 of the respective poles 21, 22, and 23, a third power supply line L3 leading from a secondary winding 42 of another transformer connected in open-delta fashion with the secondary winding 38 is connected directly to the terminal 35 of the pole 23.

By way of example, a single-phase load 43 is shown electrically connected to the bus bar 40 through a circuit breaker 44 and to a neutral bar 45 which is connected by a line 46 to the mid-point of the secondary winding 38 for impressing the load 43 with half the voltage impressed on the three-phase load 41.

The structure of the poles 21 and 22 is essentially the same as that shown in the aforementioned U.S. Patent 2,889,428, to which reference may be had for a fuller explanation. In the pole 23, however, the terminal jaws such as jaws 33 and 34 of the poles 21 and 22 and stationary contacts thereon (not shown) have been replaced by a terminal connector and stationary contact assembly 50 shown best in FIGURE 4.

The assembly 50 includes a substantially rigid flat strip-like conductor 51 having a main body portion including a straight portion 52 and a reversely curved portion 53. The free end of the straight portion 52 has an angularly disposed portion 54 extending substantially perpendicularly therefrom and enlarged at its outer end for supporting a stationary contact 55 brazed or otherwise secured thereto, while the free end of the reversely curved portion 53 has an angularly disposed portion 56 extending substantially perpendicularly therefrom for supporting the body portion 36 of the terminal connector 35 which is brazed or otherwise secured thereto. A clamping screw 37 is threadedly received by the body portion 36 for clamping the end of the third power supply line L3 receivable by the body portion. A sheet of insulating material 57 adhesively secured to the conductor 51 covers the straight portion 52 thereof and an adjacent portion of the reversely curved portion 53. The straight portion 52 and the reversely curved portion 53 of the conductor 51 are received in a groove 58 (FIGURES 5 and 6) provided in the side of the section 13 which serves as a cover for the base 14 of the pole 23. The connector 35 is spaced along the portion 56 to locate its center line and the center line of the connector 29 substantially in a common plane. It should be noted that the handle 25 and spring clips 32 and 34 shown in FIGURE 6 are associated with the pole 22.

The rest of the structure of the pole 23 will be described briefly, it being understood that the poles 21 and 22 have similar structure. A fuller description of most of the parts may be found in the aforementioned U.S. patent.

The handle 25 pivotally mounted in the pole 22 is provided with a non-circular cross bar or key 60 extending into the poles 21 and 23 so that the mechanisms of all three poles may be operated by the single handle 25 of the pole 22. The bar 60 is received in an operator 61 (FIGURE 7) pivotally mounted in the base 14 of the pole 23 and the cover portion therefor of the section 13, the operator 61 having a pair of spaced leg portions which straddle a releasable member 62 pivotally mounted on the base 14 on a pin 63 formed integrally therewith. The releasable member 62 carries a pin 64 cooperable with the operator 61 in resetting the releasable member 62 in a latched position.

A movable contact carrier 67 having a movable contact 68 secured thereto and a movable arc barrier 69 formed of insulating material connected thereto is pivotally supported in recesses on the inner sides of the leg portions of the operator 61 and retained in the recesses by an overcenter tension spring 70 connected at one end to the contact carrier 67 and at the other end to the releasable member 62.

The connector 29 includes a strap portion 72 retained by a screw 73 which also serves as an adjusting screw for calibrating a tripping mechanism secured to the inner end of the strap portion 72. The tripping mechanism includes a bimetallic conductor 74 secured to the strap portion 72, a magnetic yoke or core 75 generally U-shaped in cross section and having the bight portion thereof secured to the bimetallic conductor 74, a magnetic armature 76 pivotally supported on the core 75, and a generally U-shaped temperature-compensating bimetallic strip 77 having one leg secured to the armature 76 and the other leg engaging the core 75. The armature 76 is recessed adjacent one end to provide a pair of shoulders on opposite sides thereof receivable by a pair of cradle-like arms 79 adjacent one end of the core 75 for pivotally supporting the armature. Adjacent the supporting shoulders the end of the armature 76 is angularly disposed to form a seat for a biasing spring 80 which biases the other end of the armature 76 away from the core 75. A hooked arm 81 on the other end of the core 75 engages the other end of the armature 76 to limit the biasing action of the spring. The armature is recessed centrally thereof to provide a latching surface for the free end 82 of the releasable member 62.

A braided wire 84 has one end secured between the bimetal conductor 74 and the other end secured to the contact carrier 67. A plurality of arc extinguishing elements 85 (FIGURES 5 and 7) are provided along the path of the movable contact 68.

It will be understood that operation of the handle 25 of the pole 22 operates the contact carriers of all three poles, and with reference to the pole 23, the handle 25 pivots the operator 61 by means of the bar 60 to move the pivotal mounting for the contact carrier 67 across the line of action of the spring 70 to reverse the rotative bias of the spring thereon and thereby engage or disengage the contacts 55 and 68. Further, upon occurrence of a fault current, the armature 76 will be attracted into engagement with the core 75 to release the releasable member 62, and upon a sustained overload current of lesser magnitude, the bimetallic conductor 74 will flex to release the releasable member 62, and in either case the line of action of the spring 70 will be moved across the pivotal mounting for the contact carrier 67 and the contacts 55 and 68 will be disengaged.

A common trip means is provided so that when a fault or overload current has caused tripping of the releasable member 62 in any one of the poles, the releasable member in each of the other two poles is also released. Thus, a non-circular cross bar key 87 extends through the pole 22 into the poles 21 and 23 and each pole has a common trip cross bar portion 88 pivotally mounted therein and rotatively fixed to the key 87 so that rotation of the key 87 by the cross bar portion 88 in one pole will rotate the cross bar portions 88 in the other two poles. The cross bar portion 88 in each pole has a projecting portion or heel 90 rotatable to engage and pivot the respective armature 76 to release the respective releasable member 62. When a fault or overload current causes release of the releasable member 62 in one pole, a pin 92 in the releasable member 62 in that pole will strike the cross bar portion 88 therein to turn the key 87 and thus turn the cross bar portions 88 in the other two poles to release their releasable members by movement of a heel 90 and armature 76. A spring 93 wrapped around the cross bar portion 88 of one pole and having an end in engagement with the respective pin 92 restores the cross bar portions 88 and heels 90 of all three poles to normal position when the releasable member 62 of the one pole is reset by the operator 61 and pin 64 thereof.

It will be seen that I have provided a three-pole circuit breaker having two poles adapted to be plugged into a single-phase electrical panelboard to electrically connect them respectively to the two main bus bars thereof which are respectively fed by two power supply lines, and a third pole adapted to be electrically connected to a third power supply line to enable the circuit breaker to feed a three-phase load, each pole having an electrical connector adjacent an end of the circuit breaker for receiving an electrical conductor connected to the three-phase load, and the third pole also having a second electrical connector adjacent the same end of the circuit breaker for receiving the third power supply line, the center lines of the two connectors of the third pole being substantially in a common plane, and the connector for the third power supply line being supported by one end of a rigid conductor received in a groove on the inner side of one part of a two part casing for the third pole and supporting the stationary contact for the third pole at the other end.

Various modifications may be made in the structure shown and described without departing from the spirit and scope of the invention.

I claim:

For use in a single-phase panelboard to protect a three-phase load, a three-pole molded-case electrical circuit breaker comprising a casing having four parallel wall portions collectively defining three side-by-side compartments therein, a maximum of three circuit breaker mechanisms disposed respectively in said compartments, each of said mechanisms including a single stationary contact and a single movable contact, a maximum of two line terminals of the plug-in type disposed adjacent one end of said casing and electrically connected respectively to the stationary contacts of a first and a second of said circuit breaker mechanisms, three load terminals disposed adjacent the other end of said casing and electrically connected respectively to the movable contacts of said three circuit breaker mechanisms, a substantially rigid flat strip-like conductor having a main body portion mounted flatwise parallel to said wall portions of said casing in a groove in an inner surface of one of the wall portions defining the compartment in which the third of said circuit breaker mechanisms is disposed, the stationary contact of said third circuit breaker mechanism being secured to one end portion of said conductor adjacent said one end of said casing, and a line terminal disposed adjacent said other end of said casing and secured to the other end portion of said conductor and electrically connected by said conductor to said stationary contact of said third circuit breaker mechanism, said line terminal electrically connected to said stationary contact of said third circuit breaker mechanism and the load terminal electrically connected to the movable contact of said third circuit breaker mechanism being centered substantially in a common plane parallel to said wall portions of said casing.

References Cited by the Examiner

UNITED STATES PATENTS

| | | | |
|---|---|---|---|
| 2,362,850 | 11/44 | Platz | 200—116 |
| 2,666,114 | 1/54 | Jackson | 200—51 |
| 2,889,428 | 6/59 | Kingdon et al. | 200—16 |
| 2,925,481 | 2/60 | Casey | 200—116 |
| 2,942,083 | 6/60 | Walker et al. | 200—116 |
| 3,109,907 | 11/63 | Dessert et al. | 200—116 |

BERNARD A. GILHEANY, *Primary Examiner.*

ROGERT K. SCHAEFER, *Examiner.*